United States Patent [19]

Alfter et al.

[11] Patent Number: 5,698,705
[45] Date of Patent: Dec. 16, 1997

[54] ISOINDOLINE PIGMENTS

[75] Inventors: Frank Alfter, Kelkheim, Germany; Erwin Dietz, Wilmington, Del.; Gustav Kapaun; Siegfried Schiessler, both of Bad Soden, Germany

[73] Assignee: Hoechst Aktiengesellschaft, Frankfurt am Main, Germany

[21] Appl. No.: 475,964

[22] Filed: Jun. 7, 1995

[30] Foreign Application Priority Data

Jun. 7, 1994 [DE] Germany ............... 44 19 849.3

[51] Int. Cl.$^6$ ............... C07D 487/00
[52] U.S. Cl. ............... 548/305.4; 548/305.1
[58] Field of Search ............... 548/305.4, 305.1

[56] References Cited

U.S. PATENT DOCUMENTS

| 4,052,410 | 10/1977 | von der Crone. |
| 4,116,959 | 9/1978 | von der Crone. |
| 4,481,272 | 11/1984 | Eckell et al.. |

FOREIGN PATENT DOCUMENTS

| 2142245 | 3/1973 | Germany. |
| 1187867 | 4/1970 | United Kingdom. |

*Primary Examiner*—Johann Richter
*Attorney, Agent, or Firm*—Connolly & Hutz

[57] ABSTRACT

Novel isoindoline pigments of the formula (I)

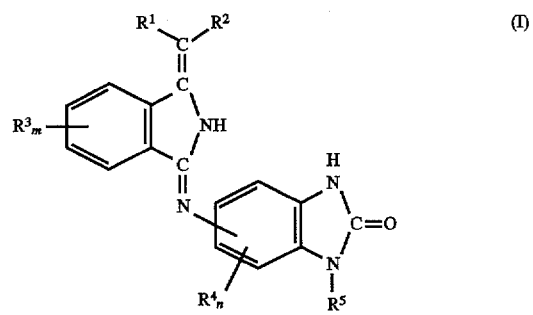

in which
$R^1$ is —CN and $R^2$ is CN or a 5- to 7-membered heterocycle;
$R^3$ is hydrogen, $C_1$–$C_4$-alkyl, phenyl, $C_1$–$C_4$-alkoxy, halogen or $C_2$–$C_4$-acylamino;
$R^4$ is hydrogen, $C_1$–$C_4$-alkyl, halogen, trifluoromethyl, methoxy, ethoxy or nitro;
m is a number from 1 to 4;
n is a number from 1 to 3; and
$R^5$ is hydrogen or $C_1$–$C_4$-alkyl.

11 Claims, No Drawings

ISOINDOLINE PIGMENTS

The present invention relates to novel isoindoline pigments based on aminobenzimidazolones.

GB-A-1 187 667 describes isoindolines based on benzimidazole, some of which have pigmentary properties, but no longer fulfill the current requirements of pigments in respect of heat stability and fastness to bleeding.

U.S. Pat. No. 3,979,386 and 4,052,410 disclose tri- to tetrahalogenated iminoisoindolinone pigments which contain a carbonyl or another imino group in the 3-position, so that in the latter case symmetric isoindolines are formed. The products are ecologically unacceptable because of their high chlorine content.

The present invention was based on the object of providing novel isoindoline pigments which meet the current requirements of pigments.

It has been found that unsymmetric isoindolines based on aminobenzimidazolones achieve the present object.

The present invention relates to an isoindoline pigment of the formula (I)

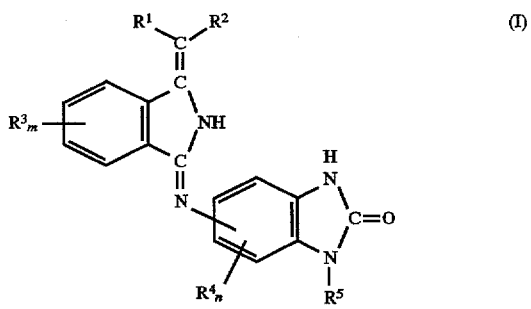

in which $R^1$ is —CN;

$R^2$ is —CN or is a saturated or unsaturated aromatic or non-aromatic 5- to 7-membered heterocyclic ring system, which can be modified by fusing onto or bridging to further heterocyclic or isocyclic ring systems, the hetero atoms being N, O and/or S; or is a group —CO-NR$^6$R$^7$, in which $R^6$ and $R^7$ are identical or different and are hydrogen or $C_1$-$C_4$-alkyl; or is a group —CO-NR$^6$R$^8$, in which $R^8$ is a saturated or unsaturated, aromatic or non-aromatic, isocyclic or heterocyclic 5- to 7-membered ring which is unsubstituted or substituted by one to 5 radicals from the group consisting of $C_1$-$C_4$-alkyl, halogen, trifluoromethyl, $C_1$-$C_4$-alkoxy, carbomethoxy, carbethoxy, carboxamide, carboxamide substituted by a $C_1$-$C_4$-alkyl or phenyl group, nitro, $C_1$-$C_4$-acylamino or hydroxyl and can be modified by fusing onto or bridging to further heterocyclic or isocyclic ring systems, the hetero atoms being N, O and/or S; or in which $R^1$ and $R^2$ together are a saturated or unsaturated, aromatic or non-aromatic heterocyclic 5- to 7-membered ring which is unsubstituted or substituted by one to 5 radicals from the group consisting of $C_1$-$C_4$-alkyl, $C_1$-$C_4$-alkoxy, halogen, trifluoromethyl, carbomethoxy, carbethoxy, carboxamide, carboxamide substituted by a $C_1$-$C_4$-alkyl or phenyl group, $C_1$-$C_4$-acylamino or hydroxyl and can be modified by fusing onto or bridging to further heterocyclic or isocyclic ring systems, the hetero atoms being N, O and/or S;

the radicals $R^3$ and $R^4$ have in each case the identical or different meanings of $R^3$ hydrogen, $C_1$-$C_4$-alkyl, phenyl, $C_1$-$C_4$-alkoxy, halogen or $C_1$-$C_4$-acylamino and $R^4$ hydrogen, $C_1$-$C_4$-alkyl, halogen, trifluoromethyl, methoxy, ethoxy or nitro;

m is a number from 1 to 4;

n is a number from 1 to 3; and $R^5$ is hydrogen or $C_1$-$C_4$-alkyl.

Isoindoline pigments which are of particular interest are those of the formula (I) in which $R^1$ is —CN;

$R^2$ is —CN or a benzimidazol-2-yl radical, quinazolon-2-yl radical, quinoxal-2-yl radical or a quinolin-2-yl radical; or is a group —CO-NR$^6$R$^7$, in which $R^6$ and $R^7$ are identical or different and are hydrogen, methyl or ethyl; or is a group —CO-NR$^6$R$^8$, in which $R^8$ is a phenyl ring or naphthyl ring or a phenyl ring or naphthyl ring which is substituted by one to 5 halogen atoms or COO($C_1$-$C_4$)-alkyl, CONH$_2$, $C_1$-$C_4$-alkyl, $C_1$-$C_4$-alkoxy, CF$_3$ or OH groups, or is a benzimidazolyl, benzimidazolonyl or quinoxalyl ring; or in which $R^1$ and $R^2$ together form a heterocyclic ring from the group consisting of barbituric acid, 2,4-dioxo-1,2,3,4-tetrahydroquinoline and thionaphthene.

Isoindoline pigments of the formula (I) which are of particular interest are those in which $R^3$ is hydrogen, methyl, ethyl, phenyl, methoxy, ethoxy, fluorine, chlorine, bromine or acetylamino;

$R^4$ is hydrogen, methyl, ethyl, fluorine, chlorine, bromine, trifluoromethyl, methoxy or ethoxy and $R^5$ is hydrogen, methyl or ethyl.

Isoindoline pigments of the formula (I) which are of special interest are those in which $R^1$ is —CN, $R^2$ is —CN, benzimidazol-2-yl, —CONH$_2$, —CONHC$_6$H$_4$Cl, —CONHC$_6$H$_3$Cl$_2$, —CONHC$_6$H$_4$CH$_3$, —CONHC$_6$H$_4$COOC$_2$H$_5$, —CONHCON$_2$, —CONHC$_6$H$_4$COOCH$_3$, —CONHC$_6$H$_3$(COOCH$_3$)$_2$ or —CONH-naphthyl, $R^3$ is hydrogen, $R^4$ is hydrogen, Cl, OCH$_3$ or CH$_3$, n is the number 1 and $R^5$ is hydrogen.

Isoindoline pigments of the formula (I) which are furthermore of particular interest are those in which $R^1$ and $R^2$ together form a barbituric acid, methylbarbituric acid, phenylbarbituric acid, 2,4-dioxo-1,2,3,4-tetrahydroquinoline or 3-hydroxythionaphthene ring.

The isoindoline pigment of the formula

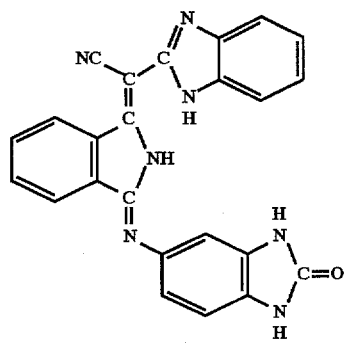

is of special interest.

The present invention also relates to a process for the preparation of an isoindoline pigment by a) reacting an isoindoline of the formula (II), which contains nucleophilically replaceable radicals X and Y in the 1- and 3-position,

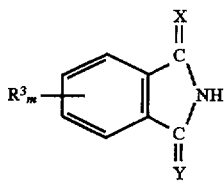

with a compound of the formula (III)

in which the H atoms of the —CH₂— group are CH-acidic, to form a compound of the formula (IV)

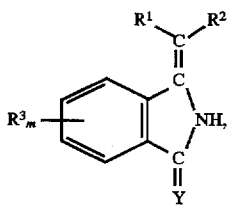

and then b) reacting the compound of the formula (IV) with a benzimidazolone of the formula (V)

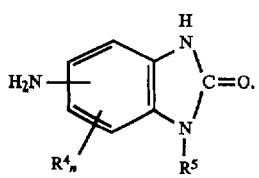

Starting from isoindolines which contain easily replaceable substituents in the 1- and 3-position, such as are known in the literature, the condensation step a) is carried out with compounds which have two easily replaceable active hydrogen atoms on a carbon atom.

Possible reactive isoindolines of the formula (II) are, for example, those in which the radical X is an imino group or a (half)-aminal grouping or a ketal grouping and the radical Y is an imino group, for example 1,3-diiminoisoindoline (DE-A-879100)

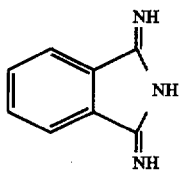

and the tautomeric forms thereof, and furthermore the glycol addition product thereof

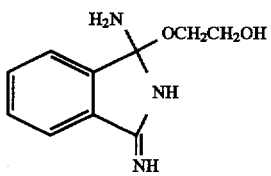

or 1,1-dialkoxyisoindolines

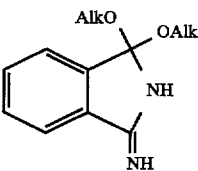

in which Alk is alkyl groups, preferably $C_1$–$C_4$-alkyl groups (DE-A-879102).

For example, 1-amino-1-(2-hydroxyethoxy)-3-imino-isoindoline reacts in accordance with the following equation:

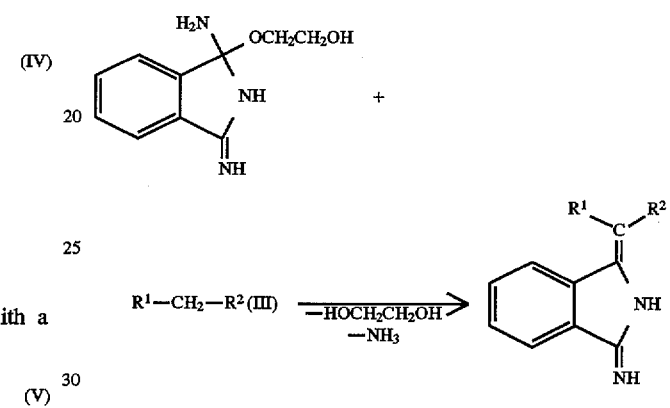

In the above reaction equation, the educt is shown in one of its possible tautomeric forms.

Possible compounds of the formula (III) are, for example: malodinitrile or cyanoacetic acid amides, such as, for example, cyanoacetic acid amide, cyanoacetic acid methylamide, cyanoacetic acid ethylamide, cyanoacetic acid phenylamide, cyanoacetic acid 4-chlorophenylamide, cyanoacetic acid 2-chlorophenylamide, cyanoacetic acid 2,4-dichlorophenylamide, cyanoacetic acid 2-tolylamide, cyanoacetic acid 3-tolylamide, cyanoacetic acid 4-tolylamide, cyanoacetic acid 4-carbethoxyphenylamide, cyanoacetic acid 4-carboxamidophenylamide, cyanoacetic acid 3,5-dicarbomethoxyphenylamide, cyanoacetic acid 4-acetylaminophenylamide, cyanoacetic acid 2-methoxyphenylamide and cyanoacetic acid naphthylamide, it being possible for the aromatic radicals to be substituted by one or more radicals from the group consisting of ethoxy, bromine, fluorine and/or trifluoromethyl; and furthermore compounds of the formula NC-CH₂-Het, in which Het is a heterocyclic ring, for example 2-(cyanomethyl)-benzimidazole, 2-(cyanomethyl)-quinazolinone or 2-(cyanomethyl)-quinoline; and furthermore heterocyclic ring systems of the formula

in which A, with C, forms a five- to seven-membered heterocyclic ring which is optionally fused with further isocyclic or heterocyclic rings, for example barbituric acid, methylbarbituric acid, phenylbarbituric acid, 2,4-dioxo-1,2,3,4-tetrahydroquinoline and 3-hydroxythionaphthene.

The particularly preferred compound of the formula (III) is 2-(cyanomethyl)-benzimidazole.

In this first condensation step, solvents which can be used are, preferably, alcohols, such as, for example, methanol, ethanol and propanol. In some cases, water and aqueous alcohols can also be employed at room temperature or up to the boiling point of the solvents.

If very reactive methylene compounds, such as, for example, 2-(cyanomethyl)-benzimidazole, are employed, undesirable disubstituted isoindolines may already be formed in this first reaction step. This undesirable second condensation can be counteracted by carrying out the reaction at the lowest possible temperature, expediently at 30° to 60° C., preferably at 45° to 55° C., and with less than the stoichiometric amount of the reactive methylene compound. A molar ratio between the reactive methylene compound of the formula (III) and the isoindoline of the formula (II) of 0.8:1 to 0.98:1, preferably 0.85:1 to 0.97:1, is expedient.

It has furthermore been found, according to the invention, that this undesirable second condensation is counteracted by establishing a suitable pH. The optimum pH range must be determined from case to case and, if 2-(cyanomethyl)-benzimidazole is used, is preferably in the range from 5 to 9, particularly preferably in the range from 6 to 8.5.

The second condensation step is carried out with aminobenzimidazolonones of the formula (V) and proceeds, for example, according to the following equation:

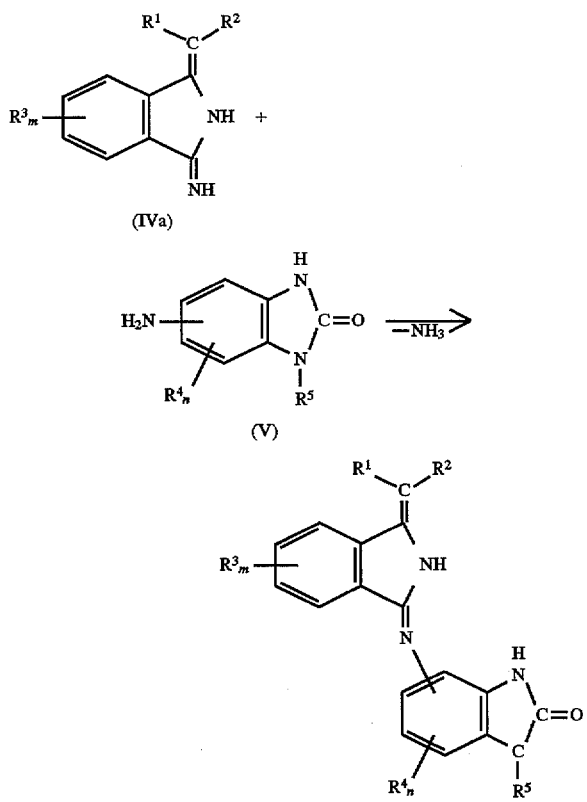

Preferred possible compounds of the formula (V) are: 5-aminobenzimidazolone, 5-amino-6-chlorobenzimidazolone, 5-amino-6-methylbenzimidazolone, 5-amino-6-methoxybenzimidazolone and 5-amino-1-methyl-benzimidazolone, in particular 5-aminobenzimidazolone.

The reaction takes place under acid catalysis, for example acetic acid or propionic acid can serve as the catalyst and simultaneously also as the solvent.

Suitable solvents for the second condensation step are, for example, N-methylpyrrolidone, dimethylformamide, alcohols, such as methanol, and mixtures of the solvents mentioned with water. The molar ratios between the compound of the formula (IV) or (IVa) and the benzimidazolone of the formula (V) are expediently 1:1 to 1:1.2.

The crude pigments formed by the process according to the invention can be finely divided by a mechanical process, such as, for example, by wet or dry grinding, or by chemical processes.

The final formulation can be carried out by a finishing process in an aqueous and/or solvent-containing system, if appropriate with the addition of customary additives.

The pigments according to the invention are particularly suitable for pigmenting high molecular weight organic materials. High molecular weight organic materials are, for example, cellulose ethers and esters, such as ethylcellulose, nitrocellulose, cellulose acetate and cellulose butyrate, naturally occurring resins or synthetic resins, such as polymerization resins or condensation resins, for example amino resins, in particular urea- and melamine-formaldehyde resins, alkyd resins, acrylic resins, phenolic resins, polycarbonates, polyolefins, such as polystyrene, polyvinyl chloride, polyethylene, polypropylene, polyacrylonitrile or polyacrylic acid esters, polyamides, polyurethanes or polyesters, rubber, casein, silicone and silicone resins, individually or as mixtures.

It is irrelevant here whether the high molecular weight organic compounds mentioned are in the form of plastic compositions or melts or in the form of spinning solutions, coatings, paints or printing inks. Depending on the intended use, it has proved to be advantageous to use the pigment formulations obtained according to the invention as blends or in the form of preparations or dispersions. The pigments according to the invention are employed in an amount of preferably 0.1 to 10% by weight, based on the high molecular weight organic material to be pigmented.

Polyolefins, such as polyethylene and polypropylene, are particularly preferred as the medium. The isoindoline pigments according to the invention are distinguished by a particularly good fastness to over-coating, fastness to bleeding and a high heat stability.

The isoindoline pigments according to the invention are suitable as coloring agents in electrophotographic toners and developers, such as, for example, one- or two-component powder toners (also called one- or two-component developers), magnetic toners, liquid toners, polymerization toners and other special toners (L. B. Schein, "Electrophotography and Development Physics"; Springer Series in Electrophysics 14, Springer Verlag, 2nd edition, 1992).

Typical toner binders are polymerization, polyaddition and polycondensation resins, such as styrene, styrene-acrylate, styrene-butadiene, acrylate, polyester and phenol-epoxy resins, polysulfones, polyurethanes, individually or in combination, as well as polyethylene and polypropylene, which can also comprise other constituents, such as charge control agents, waxes or flow auxiliaries, or to which these other constituents can be subsequently added.

The isoindoline pigments according to the invention furthermore are suitable as coloring agents in powders and powder coatings, in particular in powder coatings which can be sprayed triboelectrically or electrokinetically and can be used for coating the surface of objects of, for example, metal, wood, plastic, glass, ceramic, concrete, textile material, paper or rubber (J. F. Hughes, "Electrostatics Powder Coating" Research Studies Press, John Wiley & Sons, 1984).

Epoxy resins, polyester resins containing carboxyl and hydroxyl groups, polyurethane resins and acrylic resins, together with the customary hardeners, are typically employed as powder coating resins. Combinations of resins are also used. Thus, for example, epoxy resins are often employed in combination with polyester resins containing carboxyl and hydroxyl groups. Typical hardener components (depending on the resin system) are, for example, acid anhydrides, imidazoles and dicyanodiamide and derivatives thereof, masked isocyanates, bisacylurethanes, phenolic and melamine resins, triglycidyl isocyanurates, oxazolines and dicarboxylic acids.

The isoindoline pigments according to the invention furthermore are suitable as coloring agents in ink-jet inks which are water-based or not water-based, and in those inks which operate by the hot melt process.

In the following Examples, parts are parts by weight and "of th." means "of the theoretical yield".

PREPARATION EXAMPLES

Example 1 a) 1-[(Cyano-benzimidazol-2'-yl) -methylene]-3-iminoisoindoline 51.8 parts of 1-amino-1- (2-hydroxyethoxy) -3-iminoisoindoline ( 0.25 mol) are introduced with 31.4 parts of 2-(cyanomethyl) -benzimidazole (0.2 mol) into 600 parts of methanol and the mixture is boiled under reflux, while stirring, for 6½ hours. A yellow precipitate forms. The mixture is allowed to cool and is filtered with suction at room temperature, and the filter cake is washed thoroughly with methanol and dried at 60° C. in vacuo. Weight: 56.4 parts=99% of th.

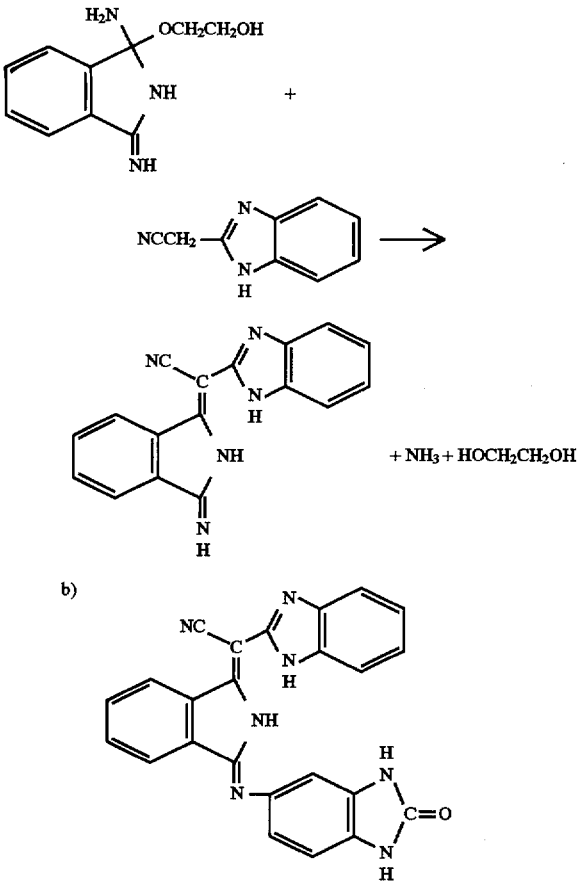

28.5 parts of 1-[(cyano-benzimidazol-2'-yl)-methylene]-3-imino-isoindoline (0.1 mol) and 14.9 parts of 5-amino-benzimidazolone (0.1 mol) are introduced into 1000 parts of glacial acetic acid and the mixture is stirred at room temperature for 1 hour. It is heated to the boiling point and stirred at the boiling point for 3 hours. Thereafter, 375 parts of dimethylformamide (DMF) are added and the mixture is stirred at 130° to 135° C. for 3 hours. It is filtered with suction at 90° to 100° C. and the residue on the filter is washed with 1000 parts of glacial acetic acid/DMF (2:1) at 90° to 100° C. Thereafter, it is washed with methanol and water and dried in vacuo at 60° C. Weight: 37.9 parts=91% of th.

If this crude pigment is subjected to vibratory grinding with a solvent, for example, a pigment which colors PVC and polyethylene an orange color is obtained. It is still heat-stable at 300° C. and gives dyeings which are fast to bleeding.

Example 2 a) 1,1-Dimethoxy-3-imino-isoindoline 25.6 parts of o-phthalodinitrile (0.2 mol) are stirred into 200 parts of methanol. 4.5 parts of sodium methylate solution, 30% strength in methanol (0.025 mol), are added at 20° C. and the mixture is stirred at 20° C. for 16 hours. A solution of 1,1-dimethoxy-3-imino-isoindoline is obtained.

b) 1-[(Cyano-benzimidazol-2'-yl)-methylene]-3-imino-isoindoline 9.6 parts of acetic acid and 13.5 parts of sodium bicarbonate are added to the solution of 1,1-dimethoxy-3-imino-isoindoline obtained according to a). A solution of 28.3 parts of 2-(cyanomethyl)-benzimidazole (0.18 mol) in 200 parts of methanol is added dropwise to this milky suspension at room temperature. The mixture is then heated at 50° C. for 4 hours, while stirring. It is filtered with suction at room temperature and the residue is washed with methanol and then with water. It is dried at 60° C. in vacuo. Weight: 49.1 parts=96% of th.

If the procedure for the synthesis is as according to 2b) and the addition of sodium bicarbonate is omitted, a considerable amount of the undesirable by-product 1,3-bis-[(cyano-benzimidazol-2'-yl)-methylene]-isoindoline is formed.

c) Second condensation stage with 5-aminobenzimidazolone 28.5 parts of 1-[(cyano-benzimidazol-2'-yl)-methylene]-3-imino-isoindoline (0.1 mol) and 14.9 parts of 5-amino-benzimidazolone (0.1 mol) are introduced into 400 parts of glacial acetic acid and the mixture is stirred at room temperature for 1 hour. It is heated to the boiling point and stirred at the boiling point for 3 hours. Thereafter, the mixture is filtered with suction at 90° to 100° C. and the residue is washed with methanol and water. It is dried in vacuo at 60° C. Weight: 40.5 parts=97% of th.

Example 3 a) The preparation of 1,1-dimethoxy-3-imino-isoindoline is carried out as in Example 2a).

b) 1-[(Cyano-benzimidazol-2'-yl)-methylene]-3-iminoisoindoline 6.8 parts of acetic acid and 8.9 parts of sodium acetate are added to the solution of 1,1-dimethoxy-3-imino-isoindoline obtained according to 2a). A solution of 28.3 parts of 2-(cyanomethyl)-benzimidazole (0.18 mol) in 200 parts of methanol is added dropwise at room temperature. The mixture is then heated at 50° C. for 4 hours, while stirring, and filtered with suction at room temperature, and the residue is washed with methanol and then with water. It is dried at 60° C. in vacuo. Weight: 49.5 parts=96.5% of th.

If the procedure for the synthesis is as according to 3b) and the addition of sodium acetate is omitted, a considerable amount of the undesirable by-product 1,3-bis-[(cyano-benzimidazol-2'-yl)-methylene]-isoindoline is formed.

c) Second condensation stage with 5-aminobenzimidazolone

1-[(Cyano-benzimidazol-2'-yl)-methylene]-3-imino-isoindoline can also be further processed in the water-moist form. For this, the procedure is as described in Example 3b) and drying of the moist filter cake is dispensed with.

84.7 parts of moist filter cake comprising 28.5 parts of 1-[(cyano-benzimidazol-2'-yl)methylene]-3-imino-isoindoline (0.1 mol), 56.2 parts of water and 14.9 parts of 5-aminobenzimidazolone (0.1 mol) are introduced into 900 parts of methanol and 100 parts of glacial acetic acid. The mixture is stirred at room temperature for 1 hour and heated at the boiling point for 6.5 hours. Thereafter, it is filtered hot with suction and the residue is washed with methanol and water. It is dried in vacuo at 60° C. Weight: 40.9 parts=98% of th.

Example 4 a) The preparation of 1-[(cyano-benzimidazol-2'-yl)-methylene]-3-imino-isoindoline is carried out as in Example 2b.

b) Second condensation stage with 5-aminobenzimidazolone 28.5 parts of 1-[(cyano-benzimidazol-2'-yl)-methylene]-3-imino-isoindoline (0.1 mol) and 14.9 parts of 5-aminobenzimidazolone (0.1 mol) are introduced into 150 parts of glacial acetic acid and 289 parts of N-methyl-pyrrolidone and the mixture is stirred at room temperature for 1 hour. It is heated to 110° C. in the course of one hour and kept at 110° C. for 6 hours. Thereafter, the mixture is filtered with suction at 110° C. The residue is washed with a mixture of glacial acetic and N-methyl-pyrrolidone (in a ratio of 2:1) of 90° C. Thereafter, it is washed with methanol and water. It is dried in vacuo at 60° C. Weight: 39.3 parts=94% of th.

If the procedure is analogous to Examples 1 to 4 and, instead of 2-(cyanomethyl)-benzimidazole, cyanoacetic acid amides are employed and these monocondensation products and 5-aminobenzimidazolone are allowed to react in a second condensation step, valuable pigments which are listed in the following Table 1 are likewise obtained.

TABLE 1

| Ex. No. | Components of the 1st condensation stage | Color of the reaction products with 5-aminobenz-imidazolone |
|---|---|---|
| 5 | NC—CH$_2$C(=O)—NH$_2$ | yellow |
| 6 | NC—CH$_2$C(=O)—NH—C$_6$H$_4$—Cl | yellow |
| 7 | NC—CH$_2$C(=O)—NH—C$_6$H$_4$—Cl | yellow |
| 8 | NC—CH$_2$C(=O)—NH—C$_6$H$_3$(Cl)—Cl | yellow |
| 9 | NC—CH$_2$C(=O)—NH—C$_6$H$_4$—CH$_3$ (ortho) | yellow |
| 10 | NC—CH$_2$C(=O)—NH—C$_6$H$_4$—CH$_3$ (meta) | brown |
| 11 | NC—CH$_2$C(=O)—NH—C$_6$H$_4$—CH$_3$ (para) | red |
| 12 | NC—CH$_2$C(=O)—NH—C$_6$H$_4$—COOC$_2$H$_5$ | orange |
| 13 | NC—CH$_2$C(=O)—NH—C$_6$H$_4$—CONH$_2$ | yellow |
| 14 | NC—CH$_2$C(=O)—NH—C$_6$H$_3$(COOCH$_3$)—COOCH$_3$ | orange |
| 15 | NC—CH$_2$C(=O)—NH—C$_6$H$_4$—NHCOCH$_3$ | orange |
| 16 | NC—CH$_2$C(=O)—NH—C$_6$H$_4$—OCH$_3$ | yellow |

TABLE 1-continued

| Ex. No. | Components of the 1st condensation stage | Color of the reaction products with 5-aminobenz-imidazolone |
|---|---|---|
| 17 | 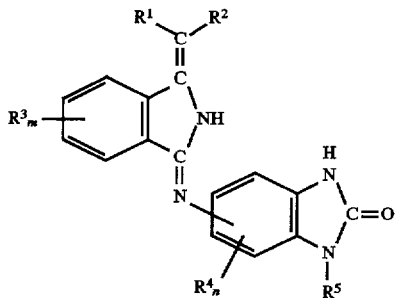 NC—CH$_2$C(=O)—NH—(naphthyl) | yellow |

If 1-[(cyano-benzimidazol-2'-yl)-methylene]-3-imino-isoindoline is used as the starting substance and the condensation in the 2nd stage is carried out with substituted 5-aminobenzimidazolones according to Table 2, valuable pigments are likewise obtained:

TABLE 2

| Ex. No. | Substituted 5-aminobenz-imidazolones | Color of the reaction product |
|---|---|---|
| 18 | H$_2$N—(benzimidazolone with Cl) | orange |
| 19 | H$_2$N—(benzimidazolone with CH$_3$O) | bluish red |
| 20 | H$_2$N—(benzimidazolone with CH$_3$) | red |

We claim:

1. An isoindoline pigment of the formula (I)

$$\text{(I)}$$

in which $R^1$ is —CN;

$R^2$ is —CN or is a saturated or unsaturated aromatic or non-aromatic 5- to 7- membered heterocyclic ring system, the hetero atoms being N, O, S or a combination thereof or $R^2$ is benzimidazol-2-yl, quinazolon-2-yl, quinoxal-2-yl, or quinolin-2-yl; or is a group —CO—NR$^6$R$^7$, in which R$^6$ and R$^7$ are identical or different and are hydrogen or C$_1$-C$_4$ alkyl;

or is a group —CO—NR$^6$R$^8$, in which R$^8$ is a saturated or unsaturated, aromatic or non-aromatic, isocyclic or heterocyclic 5- to 7-membered ring, the hetero atoms being N, O, S or a combination thereof, which ring is unsubstituted or substituted by one to 5 radicals selected from the group consisting of C$_1$-C$_4$-alkyl, halogen, trifluoromethyl, C$_1$-C$_4$-alkoxy, carbomethoxy, carbethoxy, carboxamide, carboxamide substituted by a C$_1$-C$_4$-alkyl or phenyl group, nitro, C$_1$-C$_4$-acylamino and hydroxyl or R$^8$ is a benzimidazolyl, benzimidazolonyl or quinoxalyl ring or in which R$^1$ and R$^2$ together are a saturated or unsaturated, aromatic or non-aromatic heterocyclic 5- to 7-membered ring, the hetero atoms being N, O, S or a combination thereof, which is unsubstituted or substituted by one to 5 radicals selected from the group consisting of C$_1$-C$_4$-alkyl, C$_1$-C$_4$-alkoxy, halogen, trifluoromethyl, carbomethoxy, carbethoxy, carboxamide, carboxamide substituted by a C$_1$-C$_4$-alkyl or phenyl group, C$_1$-C$_4$-acylamino, hydroxyl, or R$^1$ and R$^2$ together form a heterocyclic ring from the group consisting of a 2, 4-dioxo-1, 2, 3, 4 -tetrahydroquinoline or thionaphthene; the radicals R$^3$ and R$^4$ have in each case the identical or different meanings of R$^3$ is hydrogen, C$_1$-C$_4$-alkyl, phenyl, C$_1$-C$_4$-alkoxy, halogen or C$_1$-C$_4$-acylamino and R$^4$ is hydrogen, C$_1$-C$_4$-alkyl, halogen, trifluoromethyl, methoxy, ethoxy or nitro;

m is a number from 1 to 4;

n is a number from 1 to 3; and

R$^5$ is hydrogen or C$_1$-C$_4$-alkyl.

2. An isoindoline pigment as claimed in claim 1, in which

R$^1$ is —CN and

R$^2$ is —CN or benzimidazol-2-yl, quinazolon-2-yl, quinoxal-2-yl or quinolin-2-yl; or is a group —CO-NR$^6$R$^7$, in which R$^6$ and R$^7$ are identical or different and are hydrogen, methyl or ethyl;

or is a group —CO-NR$^6$R$^8$, in which R$^8$ is a phenyl ring or naphthyl ring, or a phenyl ring or naphthyl ring which are substituted by 1 to 5 halogen atoms or COO (C$_1$-C$_4$)—alkyl, acetylamino, CONH$_2$, C$_1$-C$_4$-alkyl, C$_1$-C$_4$-alkoxy, CF$_3$ or hydroxyl groups, or is a benzimidazolyl ring, benzimidazolonyl ring or quinoxalyl ring;

R$^1$ and R$^2$ together form a heterocyclic ring from the group consisting of barbituric acid, 2, 4-dioxo-1, 2, 3, 4-tetrahydroquinoline and thionaphthene.

3. An isoindoline pigment as claimed in claim 1, in which

R$^3$ is hydrogen, methyl, ethyl, phenyl, methoxy, ethoxy, fluorine, chlorine, bromine or acetylamino;

R$^4$ is hydrogen, methyl, ethyl, fluorine, chlorine, bromine, trifluoromethyl, methoxy or ethoxy and R$^5$ is hydrogen, methyl or ethyl.

4. An isoindoline pigment as claimed in claim 1, in which

R$^1$ is —CN

R$^2$ is —CN, benzimidazol —2—yl, —CONH$_2$, —CONHC$_6$H$_4$Cl, —CONHC$_6$H$_3$Cl$_2$, —CONHC$_6$H$_4$CH$_3$, —CONHC$_6$H$_4$COOC$_2$H$_5$, —CONHCONH$_2$, —CONHC$_6$H$_4$COOCH$_3$, —CONHC$_6$H$_3$ (COOCH$_3$)$_2$ or —CONH-naphthyl, R$^3$ is hydrogen, R$^4$ is hydrogen, Cl, OCH$_3$ OR C$_3$, n is the number 1 and $R^5$ is hydrogen.

5. An isoindoline pigment as claimed in claim 1, in which $R^1$ and $R^2$ together form a barbituric acid, methylbarbituric acid, phenylbarbituric acid, 2, 4-dioxo-1, 2, 3, 4-tetrahydroquinoline or 3-hydroxy-thionaphthene ring.

6. The isoindoline pigment of the formula

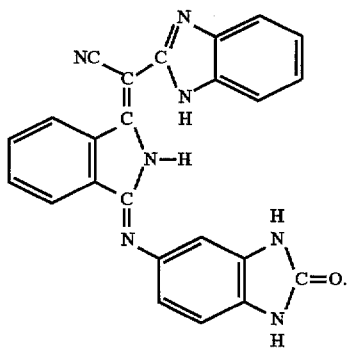

7. A process for the preparation of an isoindoline pigment of the formula (I)

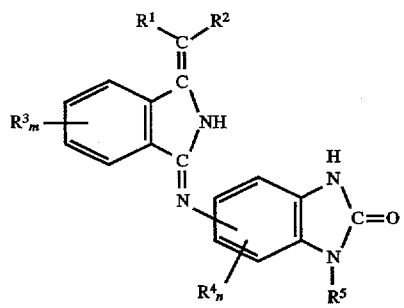
(I)

in which $R^1$ is —CN;

$R^2$ is —CN or is a saturated or unsaturated aromatic or non-aromatic 5- to 7- membered heterocyclic ring system, the hetero atoms being N, O, S or a combination thereof or $R^2$ is benzimidazol-2-yl, quinazolon-2-yl, quinoxal-2-yl, or quinolin-2-yl; or is a group —CO—NR$^6$R$^7$, in which $R^6$ and $R^7$ are identical or different and are hydrogen or $C_1$–$C_4$ alkyl;

or is a group —CO—NR$^6$R$^8$, in which $R^8$ is a saturated or unsaturated, aromatic or non-aromatic, isocyclic or heterocyclic 5- to 7-membered ring, the hetero atoms being N, O, S or a combination thereof, which ring is unsubstituted or substituted by one to 5 radicals selected from the group consisting of $C_1$–$C_4$-alkyl, halogen, trifluoromethyl, $C_1$–$C_4$-alkoxy, carbomethoxy, carbethoxy, carboxamide, carboxamide substituted by a $C_1$–$C_4$-alkyl or phenyl group, nitro, $C_1$–$C_4$-acylamino and hydroxyl or $R^8$ is a benzimidazolyl, benzimidazolonyl or quinoxalyl ring or in which $R^1$ and $R^2$ together are a saturated or unsaturated, aromatic or non-aromatic heterocyclic 5- to 7-membered ring, the hetero atoms being N, O, S or a combination thereof, which is unsubstituted or substituted by one to 5 radicals selected from the group consisting of $C_1$–$C_4$-alkyl, $C_1$–$C_4$-alkoxy, halogen, trifluoromethyl, carbomethoxy, carbethoxy, carboxamide, carboxamide substituted by a $C_1$–$C_4$-alkyl or phenyl group, $C_1$–$C_4$-acylamino, hydroxyl, or $R^1$ and $R^2$ together form a heterocyclic ring from the group consisting of a 2, 4-dioxo-1, 2, 3, 4 -tetrahydroquinoline or thionaphthene; the radicals $R^3$ and $R^4$ have in each case the identical or different meanings of $R^3$ is hydrogen, $C_1$–$C_4$-alkyl, phenyl, $C_1$–$C_4$-alkoxy, halogen or $C_1$–$C_4$-acylamino and $R^4$ is hydrogen, $C_1$–$C_4$-alkyl, halogen, trifluoromethyl, methoxy, ethoxy or nitro;

m is a number from 1 to 4;

n is a number from 1 to 3; and $R^5$ is hydrogen or $C_1$–$C_4$-alkyl.

which comprises a) reacting an isoindoline of the formula (II), which contains nucleophilically replaceable radicals X and Y in the 1- and 3-position,

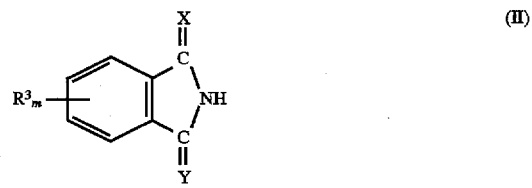
(II)

with a compound of the formula (III)

(III), in which the H atoms of the —CH$_2$— group are CH-acidic, to form a compound of the formula (IV)

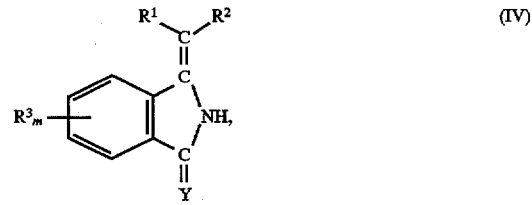
(IV)

and then b) reacting the compound of the formula (IV) with a benzimidazolone of the formula (V)

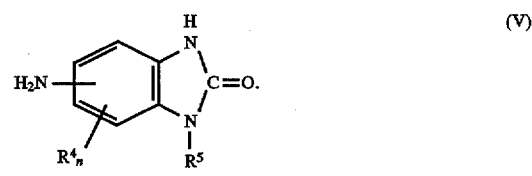
(V)

8. The process as claimed in claim 7, wherein step a) is carried out at a temperature of 30° to 60° C., and at a pH of 5 to 9.

9. The process as claimed in claim 7, wherein step a) is carried out at a temperature of 45° to 55° C., and at a pH of 6 to 8.5.

10. The process as claimed in claim 7, wherein the reaction in step b) is carried out with a 5-amino-benzimidazolone.

11. The process as claimed in claim 7, wherein the radical X is an imino group, a half-aminal grouping, an aminal grouping or a ketal grouping and the radical Y is an imino group.

* * * * *